July 21, 1959 R. W. OATHOUT 2,895,615
FILTER
Filed Aug. 16, 1957 2 Sheets-Sheet 1
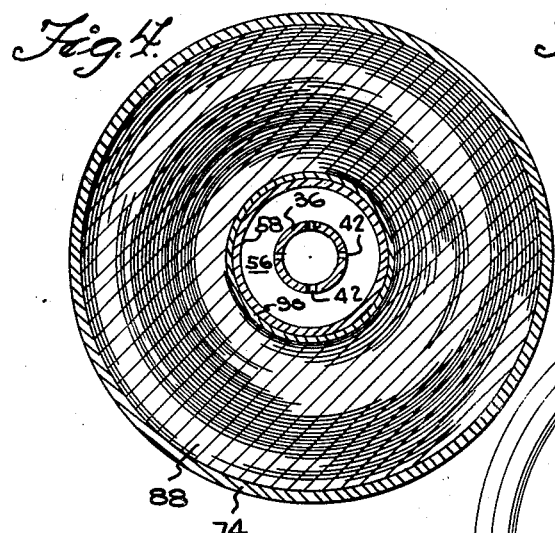
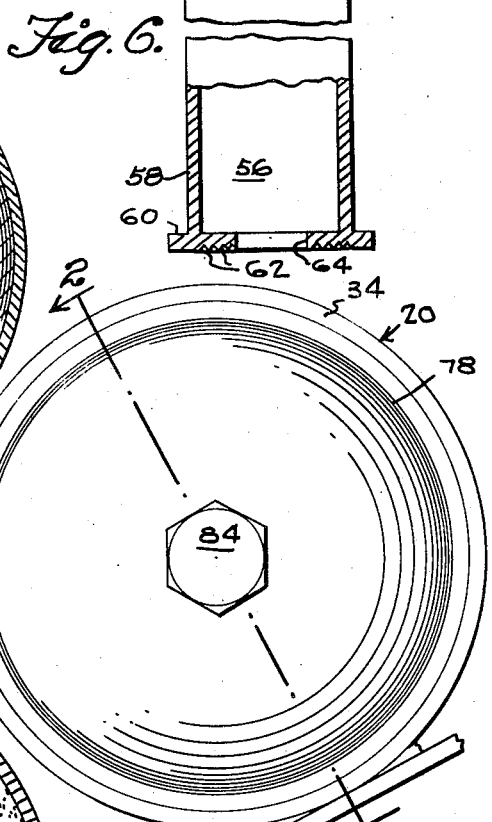
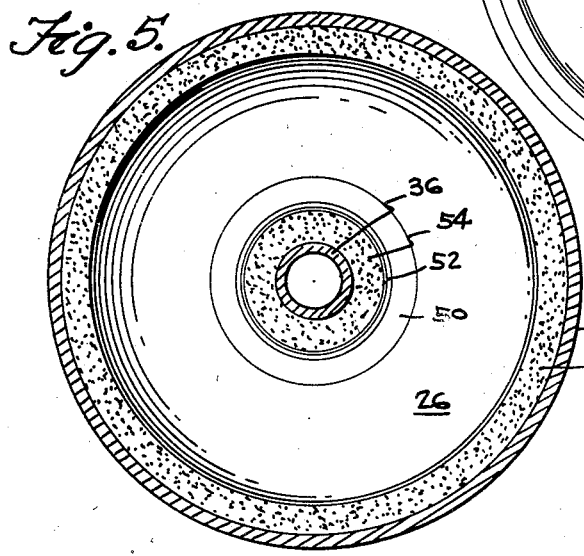
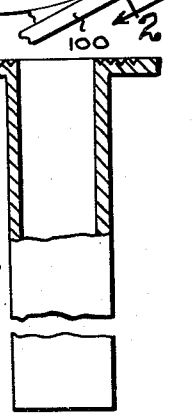
INVENTOR.
Richard W. Oathout,
BY
McMorrow, Berman + Davidson
ATTORNEYS

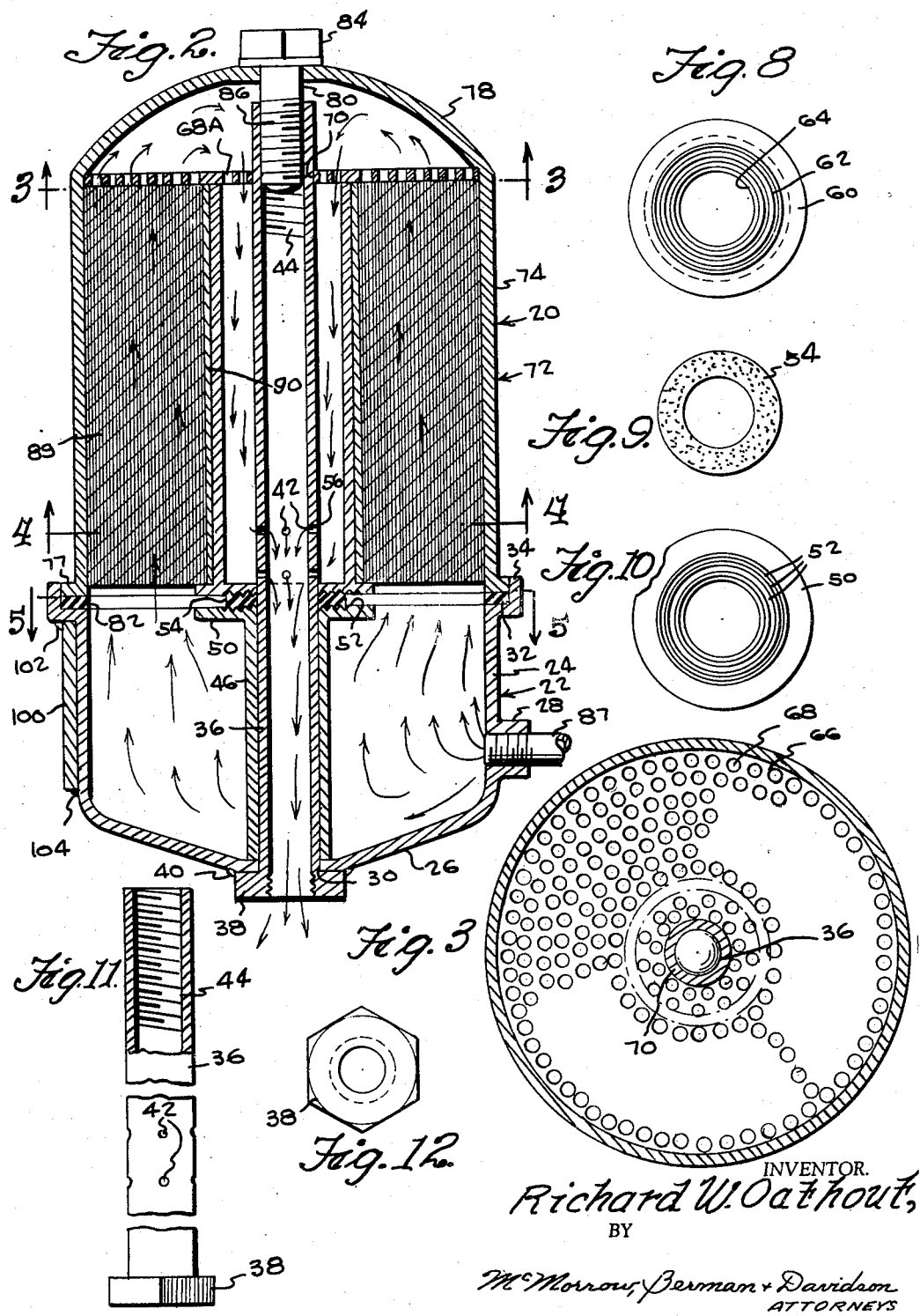

United States Patent Office 2,895,615
Patented July 21, 1959

2,895,615

FILTER

Richard W. Oathout, San Clemente, Calif.

Application August 16, 1957, Serial No. 678,497

4 Claims. (Cl. 210—439)

The present invention relates to means for separating foreign substances from a fluid or liquid, and more specifically, the instant invention pertains to means for filtering impurities from a fluid.

One of the primary objects of this invention is to provide an oil filter for use in connection with the oil system of an internal combustion engine, and is especially designed for adaptation for the oil system of an automobile motor.

A further object of this invention is to provide an oil filter wherein the filtering element comprises porous paper tissue.

A still further object of this invention is to provide a filter element of the type described, the element being readily replaceable.

Still another object of this invention is to provide an oil filter device wherein the filter element is readily replaceable and which comprises an ordinary toilet tissue roll having the conventional dimensions and being readily available on the open market.

This invention contemplates, as a still further object thereof, the provision of an oil filter for the oil system of an automobile motor or other types of internal combustion engines wherein the filter is non-complex in construction and assembly, inexpensive to manufacture, and durable in use.

Other and further objects and advantages of the instant invention will become more apparent from a consideration of the following specification when read in conjunction with the annexed drawings, in which:

Figure 1 is a top plan view of a filter device constructed in accordance with the teachings of the present invention;

Figure 2 is a vertical cross-sectional view taken substantially on the inclined plane of line 2—2 of Figure 1, looking in the direction of the arrows;

Figure 3 is a detailed cross-sectional view taken substantially on the horizontal plane of line 3—3 of Figure 2, looking in the direction of the arrows;

Figure 4 is a detailed cross-sectional view taken on the horizontal plane of line 4—4 of Figure 2, looking in the direction of the arrows;

Figure 5 is a detailed cross-sectional view taken substantially on the line 5—5, of Figure 2, looking in the direction of the arrows;

Figure 6 is a fragmentary detailed cross-sectional view of the upper fluid discharge chamber;

Figure 7 is a fragmentary detailed cross-sectional view partly in elevation of the support member for the fluid discharge chamber illustrated in Figure 6;

Figure 8 is an end elevational view of the upper fluid discharge chamber illustrated in Figure 6;

Figure 9 is an end elevational view of the sealing washer interposed between the fluid discharge chamber and the support member therefor;

Figure 10 is an end elevational view of the support member illustrated in Figure 7;

Figure 11 is a fragmentary detailed cross-sectional view partly in elevation of the fluid discharge conduit; and Figure 12 is an end elevation of the fluid discharge conduit illustrated in Figure 11.

Referring now more specifically to the drawings, reference numeral 20 designates, in general, a filter device constructed in accordance with the present invention. As illustrated therein, the filter device 20 is seen to comprise an oil reservoir designated at 22. The reservoir 22 is substantially cylindrical in configuration and includes a side wall 24 having a lower end wall at 26 integrally connected therewith. The side wall 24 is provided with an integrally formed laterally and outwardly extending internally threaded boss 28, and the end wall 26 is provided with a central opening 30 to serve a function to be described below.

The side wall 24 at the open upper end thereof is constructed with a laterally and outwardly extending circumferential flange 32 which terminates at its outer end in a vertical circumferential flange 34 outwardly spaced from the side wall 24.

Reference numeral 36 denotes an elongated substantially hollow cylindrical fluid discharge conduit which extends through the opening 30 and projects above the open upper end of the reservoir 22. The lower end of the fluid discharge conduit 36 terminates in an enlarged head which is welded to the bottom wall 26 at 40. As is seen in the drawings, the fluid discharge conduit 36 is coaxially aligned with respect to the side wall 24 of the fluid reservoir 22. As is illustrated in Figures 2 and 11 of the drawings, the fluid discharge conduit 36 has formed therein intermediate its respective ends, a plurality of transversely extending apertures 42 which serve a function to be subsequently described. The upper end of the fluid discharge conduit is internally threaded at 44, the threads 44 serving a utilitarian purpose also to be set forth in detail below.

An elongated substantially hollow cylindrical sleeve 46 is telescoped over the fluid discharge conduit 36 and the lower end thereof is seated on the bottom wall 26. The upper end of the sleeve 46 terminates in a laterally and outwardly projecting radial flange 50 having a plurality of circular grooves 52 formed therein and arranged in concentric relation relative to each other (see Figures 2 and 10).

An annular sealing washer 54 is mounted over the fluid discharge conduit 36 and is seated against the lands formed by the grooves 52 in the flange 50.

Reference numeral 56 denotes an elongated substantially hollow cylindrical upper fluid discharge chamber having a side wall 58 which terminates at its lower end in an integrally connected annular flange 60 having portions thereof extending on each side of the wall 58. The outer side of that portion of the annular flange 60 which projects inwardly from the side wall 58 is formed with a plurality of grooves 62 which are arranged in concentric relation to each other. The fluid discharge pipe 36 is received through the aperture 64 of the annular flange 60 and the grooved end of the fluid discharge chamber engages against the upper side of the sealing washer 54. It is now seen that the side wall 58 of the fluid discharge chamber 56 is concentrically positioned in laterally spaced relation with respect to the fluid discharge conduit 36.

Referring now to Figures 2 and 3, reference numeral 66 indicates a circular plate having a plurality of perforations 68 and a centrally positioned opening 70. The upper end of the fluid discharge conduit 36 is received through the opening 70 and the plate 66 is supported in elevated position on the upper end of the wall 58 of the fluid discharge chamber 56.

Reference numeral 72 designates, in general, a closure member for the filter 20. The closure member 72 is seen to comprise an elongated substantially hollow cylindrical side wall 74 having an integrally connected radial flange 77 projecting laterally outwardly from its lower end. The upper end of the side wall 74 is closed by a dome-shaped end wall 78 having a centrally positioned aperture 80 extending transversely therethrough. As is seen in Figure 2, the radial flange 77 is received within the flange 34 and seats against a washer 82 supported on the shoulder formed by the flange 32. A bolt 84 externally threaded at 86 extends through the opening 80 and threadedly engages the threads 44 formed in the upper end of the fluid discharge conduit 36. From the foregoing description, it is now seen that tightening the bolt 84 will cause the flange 76 to move downwardly toward the flange 32 thereby compressing the washer 82 therebetween to effect a liquid tight seal.

A pipe 87 has one of its ends connected with the oil system of an internal combustion engine (not shown) and the other end thereof is threaded into the boss 28. Thus, oil under pressure will be fed from the internal combustion engine to the filter 20.

To utilize the filter 20, the operator removes the bolt 84 from the upper end of the fluid discharge conduit 36 and thereafter lifts the closure member 72 from the reservoir 22. A roll of porous tissue material 88 such as, for example, a roll of conventional toilet tissue relatively tightly wound on an elongated substantially hollow tubular core 90 is telescoped over the side wall 58 of the fluid discharge chamber 56, the plate 66 having first been removed from the upper end thereof. The lower end of the core 90 is supported on that portion of the flange 60 which extends laterally and outwardly from the side wall 58 of the fluid discharge chamber 56. The plate 66 is then replaced in the position previously described and the closure member 72 is again connected to the reservoir 22 in the manner described above.

Assuming that the internal combustion engine is in operation, oil under pressure will flow through the pipe 87 into the reservoir 22 and after the reservoir 22 has been completely filled, additional oil fed thereto under pressure will cause some of the oil to move upwardly through the tissue 88. As the oil passes through the tissue 88 foreign matter or impurities contained in the oil stream will be filtered therefrom and retained in the tissue 88.

The oil, upon reaching the plate 66, passes upwardly through the perforations 68 and into the dome 78. The oil is discharged from the dome 78 through the perforations 68A which extend between the outer side of the fluid discharge conduit 36 and the inner side of the side wall 58 of the fluid discharge chamber 56. The cleansed oil then falls under gravity and under oil pressure to the bottom of the fluid discharge chamber 56 and then passes through the apertures 42 formed in the side wall of the fluid discharge conduit 36 and is discharged through the open lower end of the conduit 36 for return to the internal combustion oil system through a conduit connected with the head 38.

Reference numeral 100 designates any suitable bracket means for supporting the filter 20 on the internal combustion engine. If desired, the bracket 100 may be welded at 102 to the flange 32 and the same may be welded at 104 to the side wall 24 of the reservoir 22.

All of the component elements of the above described filter, with the exception of the porous tissue 88 and its core 90, and the sealing elements 54 and 82, are preferably formed of steel or of an aluminum or magnesium alloy material. The sealing elements 54 and 82 are preferably formed of neoprene.

Having described and illustrated one embodiment of this invention in detail, it will be understood that the same is offered by way of example, and that this invention is to be limited only by the scope of the appended claims.

What is claimed is:

1. A fluid filter comprising a reservoir having a substantially hollow cylindrical side wall having an end wall extending across one end thereof, a fluid inlet port extending transversely through said side wall, said end wall having a centrally positioned opening extending transversely therethrough, an elongated substantially hollow tubular fluid discharge conduit extending through said opening and having an end thereof projecting beyond the other end of said reservoir and having a plurality of apertures extending transversely therethrough intermediate its ends, means rigidly securing the other end of said conduit to said end wall, an elongated substantially hollow support member having a cylindrical side wall telescoped over said conduit and having an end thereof fixedly secured to said end wall, the other end of said side wall terminating at a point proximate to but spaced from said apertures and being integral with a laterally outwardly extending radial flange, a fluid discharge chamber comprising a substantially cylindrical side wall having an integrally formed annular flange at one end thereof, said flange having portions thereof extending on opposite sides of said last mentioned side wall, said discharge conduit extending through the opening formed in one portion of said annular flange with said annular flange positioned in confronting relation relative to said radial flange and with said last named cylindrical side wall disposed in spaced concentric relation with respect to adjacent portions of said conduit and the space therebetween comprising a fluid discharge chamber, a fluid tight sealing ring interposed between said radial and annular flanges, a substantially circular plate having a plurality of perforations extending transversely therethrough and a centrally positioned aperture, said fluid discharge conduit extending through said aperture, and said plate being supported on the other end of said side wall of said chamber, a closure member for the other end of said receptacle, said closure member comprising an elongated cylindrical side wall surrounding said side wall of said fluid discharge chamber in laterally spaced relation relative thereto, one end of said cylindrical wall for said closure member being juxtaposed with respect to the other end of said cylindrical wall of said reservoir, a fluid-tight sealing ring interposed between one end of said closure member and said other end of said receptacle, the other end of said cylindrical wall of said closure member having a dome-shaped end wall extending thereacross and integrally connected with, said dome-shaped end wall projecting laterally away from the adjacent side of said plate and the adjacent end of said fluid discharge conduit, and a bolt extending through said dome-shaped end wall and threadedly engaging within the adjacent end of said fluid discharge conduit, said bolt serving to secure said closure member on said receptacle, said side wall of said fluid discharge chamber being adapted to telescopically receive thereover a hollow cylindrical core of a roll of porous tissue paper, said core having an end thereof seated against the other portion of said annular flange, said plate extending across the other end of said core and the adjacent side of said roll of porous tissue paper, and said roll of porous tissue paper occupying substantially the entire space between said side wall of said discharge chamber and the adjacent portions of said side wall of said closure member.

2. A fluid filter as defined in claim 1, wherein means are provided for connecting said inlet port with a source of fluid under pressure and wherein means are provided for connection with said fluid discharge conduit for returning the filtered fluid to said source.

3. A fluid filter comprising a reservoir having a side wall, said side wall having an end wall extending across one end thereof, a fluid inlet port extending transversely through said side wall, said end wall having an opening extending transversely therethrough, an elongated tubular fluid discharge conduit extending through said opening and having an end thereof projecting beyond the other end of said reservoir and having a plurality of apertures extending transversely therethrough intermediate its ends, means rigidly securing the other end of said conduit to said end wall, an elongated substantially hollow support member having a side wall telescoped over said conduit and having an end thereof fixedly secured to said end wall, the other end of said side wall terminating at a point proximate to but spaced from said apertures and being secured to a radial flange, a fluid discharge chamber comprising a side wall having an annular flange at one end thereof, said flange having portions thereof extending on opposite sides of said last named side wall, said discharge conduit extending through the opening formed in one portion of said annular flange with said annular flange positioned in confronting relation relative to said radial flange and with said last named side wall disposed in spaced concentric relation with respect to adjacent portions of said conduit and the space therebetween comprising a fluid discharge chamber, a fluid tight sealing ring interposed between said radial and annular flanges, a plate having a plurality of perforations extending transversely therethrough and a centrally positioned aperture, said fluid discharge conduit extending through said aperture, and said plate being supported on the other end of said side wall of said chamber, a closure member for the other end of said receptacle, said closure member comprising an elongated side wall surrounding said side wall of said fluid discharge chamber in laterally spaced relation relative thereto, one end of said wall for said closure member being juxtaposed with respect to the other end of said side wall of said reservoir, a fluid tight sealing ring interposed between one end of said closure member and said other end of said receptacle, the other end of said wall of said closure member having an end wall extending thereacross and connected with said end wall projecting laterally away from the adjacent side of said plate and the adjacent end of said fluid discharge conduit, and means extending through said last named end wall and engaging within the adjacent end of said fluid discharge conduit in order to serve to secure said closure member on said receptacle, said side wall of said fluid discharge chamber being adapted to telescopically receive thereover a hollow core of a roll of porous tissue paper, said core having an end thereof seated against the other portion of said annular flange, and said plate extending across the other end of said core and the adjacent side of said roll of porous tissue paper.

4. A fluid filter as defined in claim 3, wherein means are provided for connecting said inlet port with a source of fluid under pressure and wherein means are provided for connection with said fluid discharge conduit for returning the filtered fluid to said source.

References Cited in the file of this patent
UNITED STATES PATENTS

| | | |
|---|---|---|
| 2,076,934 | Burckhalter | Apr. 13, 1937 |
| 2,110,009 | Weidenbacker | Mar. 1, 1938 |
| 2,547,857 | Cook | Apr. 3, 1951 |